United States Patent
Deleu et al.

(10) Patent No.: US 7,650,417 B2
(45) Date of Patent: Jan. 19, 2010

(54) METHOD FOR SETTING UP A COMMUNICATION BETWEEN A DEVICE AND A HOST APPLICATION OVER AN IP NETWORK

(75) Inventors: Johan Ghislain Deleu, Schelle (BE); Dirk De Bruycker, Beveren-Waas (BE); Peter Jozef Jeanne Cosemans, Lint (BE)

(73) Assignee: Alcatel, Paris (FR)

( * ) Notice: Subject to any disclaimer, the term of this patent is extended or adjusted under 35 U.S.C. 154(b) by 1471 days.

(21) Appl. No.: 10/278,842

(22) Filed: Oct. 24, 2002

(65) Prior Publication Data

US 2003/0084173 A1    May 1, 2003

(30) Foreign Application Priority Data

Oct. 25, 2001 (EP) .................... 01402766

(51) Int. Cl.
*G06F 15/177* (2006.01)
(52) U.S. Cl. .................. 709/229; 709/222; 709/224
(58) Field of Classification Search ............. 709/224, 709/222, 229
See application file for complete search history.

(56) References Cited

U.S. PATENT DOCUMENTS

| 6,115,385 A | 9/2000 | Vig | |
| 6,249,814 B1* | 6/2001 | Shaffer et al. | 709/223 |
| 6,636,499 B1* | 10/2003 | Dowling | 370/338 |
| 6,725,281 B1* | 4/2004 | Zintel et al. | 719/318 |
| 6,892,230 B1* | 5/2005 | Gu et al. | 709/220 |
| 2003/0005100 A1* | 1/2003 | Barnard et al. | 709/223 |

FOREIGN PATENT DOCUMENTS

| EP | 1 139 635 A2 | 10/2001 |
| WO | WO 01/31847 A1 | 5/2001 |

* cited by examiner

*Primary Examiner*—Tonia L Dollinger
*Assistant Examiner*—Kyung H Shin
(74) *Attorney, Agent, or Firm*—Sughrue Mion, PLLC

(57) ABSTRACT

A method is described for setting up a communication between a device (R1;R2) and a host application (A11; A12; A21; A22) over an IP network, where this device has no externally known IP address. The method includes the steps of:

a. sending out a multicast discovery request by the host application to a specific multicast address and a specific port known by the device;
b. the device responding to the discovery message with a multicast discovery response to the specific multicast address and specific port number, the discovery response including a unique identification parameter proper to the device and the host IP address and application port number;
c. the host application accepting this identification message based on the host IP address and application port number and sending subsequent multicast messages to the specific multicast address and specific port and including the identification parameter;
d. the device accepting the subsequent multicast messages based on the identification parameter and sending subsequent multicast messages to the specific multicast address and specific port and including the identification parameter and the host IP address and application port number.

5 Claims, 1 Drawing Sheet

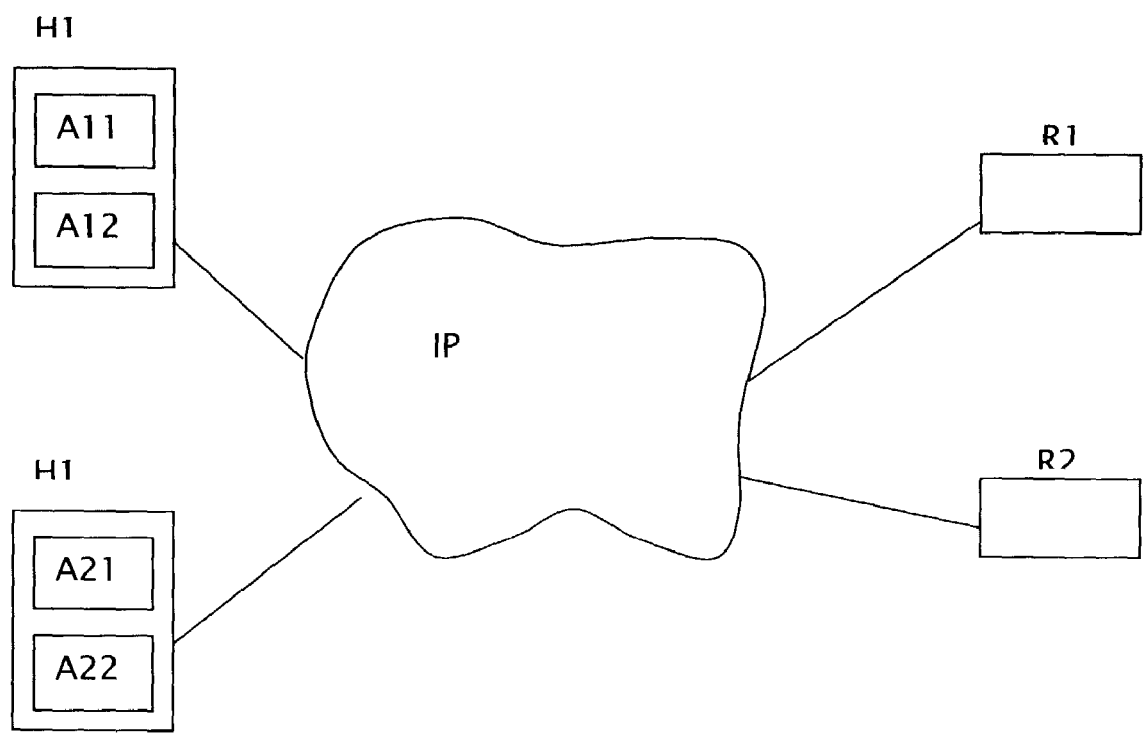

METHOD FOR SETTING UP A COMMUNICATION BETWEEN A DEVICE AND A HOST APPLICATION OVER AN IP NETWORK

The present invention relates to a method for setting up a communication between a device and a host application over an IP network, where said device has no externally known IP address.

In order to be able to operate a device over an IP network, there's a need for the device to have a unique IP address. Currently a few solutions exist to assign these IP addresses: an IP address may be manually configured by the network administrator before bringing the device on-line. This is however only possible to maintain in stable networks and it is error-prone. For larger networks a frequently used technique is to have a single node act as network address server. This server then automatically assigns unique IP addresses to the other hosts in the network. Finally in small office and home networks, IP addresses for local network communication can be generated automatically.

When the device has no unique IP address it can not be reached directly.

The objective of this invention is to enable communication with devices having no externally known IP address, without the need to assign such an address. This is realized by the method as described in claim 1, and by the host and device of claims 2 and 3 and the software programs of claims 4 and 5 for realizing this method. Indeed by sending a discovery request to a specific multicast address and specific port, both known by the device, the device can be reached. However, all devices knowing and listening to this specific multicast address and specific port are also reached in this way and will respond to this discovery request. The subsequently sent discovery responses contain an identification parameter which makes it possible for the host application to thereafter reach a specific device by including the identification parameter, whilst the other devices having another identification will ignore the subsequent messages. The discovery response and all subsequent messages sent by the device include the host IP address and application port number where the discovery request originated from to allow the device to communicate with a specific host application.

A characteristic feature of the present invention is that this method can be used to configure devices on a local network, e.g. DSL routers not having a known IP address, by sending in the subsequent messages information enabling the device to configure itself.

The above and other objects and features of the invention will become more apparent and the invention itself will be best understood by referring to the following description of an embodiment taken in conjunction with the accompanying drawings wherein a schematic is shown of an IP network to which a host modules H1 (with running applications A11 and A12) and H2 (with running applications A21 and A22) and DSL routers R1 and R2 are connected.

The address of the DSL routers is not known. In order to be able to reach a DSL router, e.g. R1, an a host application, e.g. A11 sends a multicast message over the IP network, in this embodiment called a discovery request, to a specific multicast address and a specific port as registered with an official organism such as IANA and known by R1 and R2. Upon receipt of this message the DSL routers R1 and R2 send a discovery response to the same specific multicast address and specific port, and include in this message an identifier unique for each of these particular DSL routers and the host IP address and application port number to specify the host application addressed, i.e. A11. This unique device identifier can be a MAC address, a serial number or any other parameter that is not shared with any other device. The discovery response is accepted only by A11, based on the included host IP address and application port number.

Once the unique identifier is known to the host application A11, this identifier is included by the host application in all subsequent messages sent to the specific multicast address and port. Only the DSL router that matches to the identifier, i.e. in this case R1, interprets the message as being intended for it and accepts and interprets the messages. These messages can for instance contain information for configuring the router. All other devices, e.g. R2 receiving the messages via the specific multicast address and specific port just ignore these messages.

Vice versa, the DSL router R1 includes the host IP address and application port number identifying the host application in all subsequent messages to specify the host application addressed, i.e. A11. All other host applications, e.g. A22, receiving the messages via the specific multicast address and specific port just ignore these messages.

While the principles of the invention have been described above in connection with specific apparatus, it is to be clearly understood that this description is made only by way of example and not as a limitation on the scope of the invention, as defined in the appended claims.

The invention claimed is:

1. A method for setting up a communication between a device and a host application over an Internet Protocol (IP) network, where said device has no externally known IP address, said method comprising:
   a) sending out a multicast discovery request by said host application to a specific multicast address and a specific port known by said device;
   b) said device responding to said discovery request with a multicast discovery response sent to said specific multicast address and specific port number, containing an identification message including a unique identification parameter corresponding to said device, a host IP address and an application port number as identified from said discovery request;
   c) said host application accepting said discovery response based on said host IP address and application port number and sending subsequent multicast messages to said specific multicast address and specific port and including said identification parameter; and
   d) said device accepting said subsequent multicast messages based on said identification parameter and sending subsequent multicast messages to said specific multicast address and specific port and including said identification parameter and said host IP address and application port number; wherein said subsequent multicast messages include information enabling said device to configure itself.

2. A computer readable program on which is recorded a program for running on a host connected to an IP network to which also at least one device is connected, said device having an address that is not externally known, said program executing the steps a) and c) of the method according to claim 1.

3. A computer readable medium on which is recorded a program for running on a device connected to an IP network, to which also at least one host is connected, said device having an address that is not externally known, said program executing the steps b) and d) of the method according to claim 1.

4. A host application for being connected to an IP network to which also at least one device having an IP address that is not externally known can be connected, said host application comprising:
- generation means for generating a discovery request,
- transmission means for multicasting said discovery request to a specific multicast address and a specific port known by said device,
- reception means for receiving a discovery response, multicast by said device in response to said discovery request, from said specific multicast address and specific port, which includes an identification parameter which identifies said device, and
- generation means for generating subsequent multicast messages including said identification parameter, and
- transmission means for transmitting said subsequent multicast messages to said specific multicast address and said specific port; wherein
- said generation means includes information enabling said device to configure itself in said subsequent messages.

5. A device for being connected to an IP network to which also at least one host application can be connected, said device having an address that is not externally known, said device comprising:
- reception means for receiving a discovery request multicast by said host application to a specific multicast address and a specific port known by said device; and
- transmission means for multicasting a discovery response to said specific multicast address and said specific port, including an identification parameter identifying said device and said host IP address and application port number,
- wherein said reception means receives subsequent multicast messages, including said identification parameter, sent by said host to said specific multicast address and said specific port;
- wherein said reception means recognize said subsequent messages include information enabling said device to configure itself in said subsequent messages.

* * * * *

UNITED STATES PATENT AND TRADEMARK OFFICE
CERTIFICATE OF CORRECTION

PATENT NO. : 7,650,417 B2 Page 1 of 1
APPLICATION NO. : 10/278842
DATED : January 19, 2010
INVENTOR(S) : Deleu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2108 days.

Signed and Sealed this

Twenty-eighth Day of December, 2010

David J. Kappos
*Director of the United States Patent and Trademark Office*